Aug. 25, 1953
W. V. MEDLIN
2,650,155
APPARATUS FOR STRIPPING AND REGENERATING
SPENT ADSORPTIVE POWDERS
Filed July 16, 1951
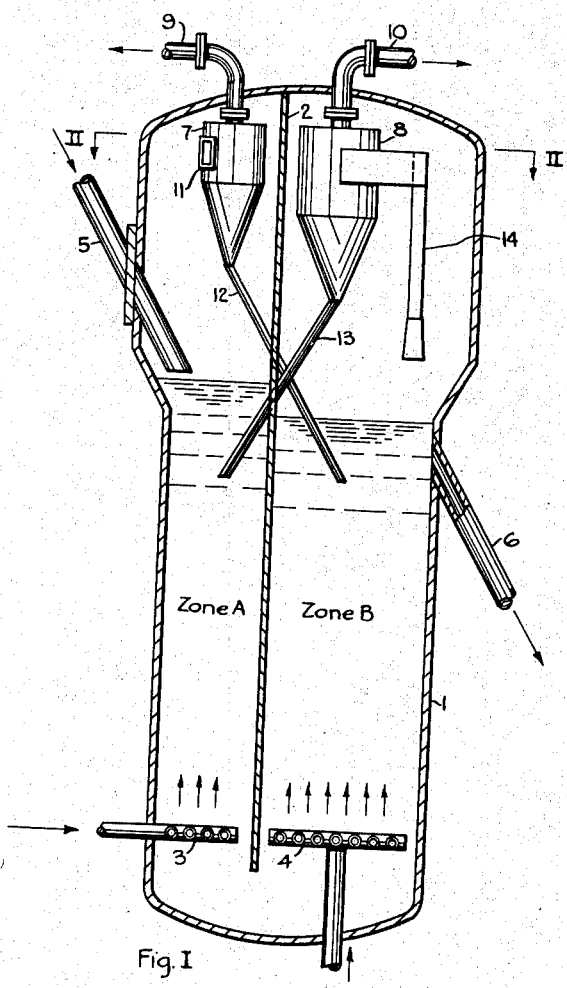
Fig. I
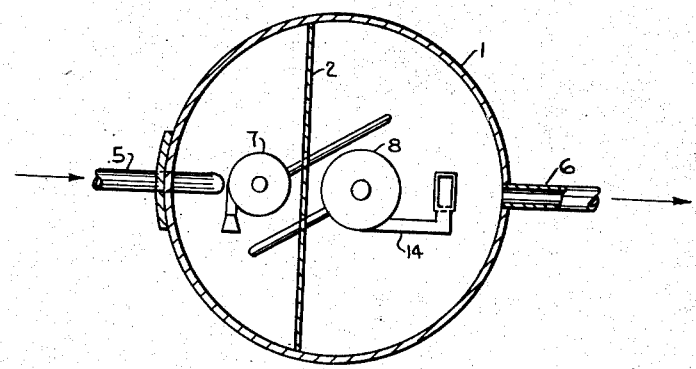
Fig. II
Inventor: William V. Medlin
By: *C. J. Ott*
His Attorney Patented Aug. 25, 1953

2,650,155

UNITED STATES PATENT OFFICE 2,650,155

APPARATUS FOR STRIPPING AND REGENERATING SPENT ADSORPTIVE POWDERS

William V. Medlin, Albany, Calif., assignor to Shell Development Company, Emeryville, Calif., a corporation of Delaware Application July 16, 1951, Serial No. 236,991

2 Claims. (Cl. 23—288)

This invention relates to an apparatus of improved arrangement and structure for the stripping and regeneration of spent adsorptive powders.

An object of the invention is to provide a method and apparatus for the regeneration of various solids by stripping and burning which method and apparatus allow the regeneration to be carried out with a minimum pumping and a minimum consumption of compressed air for burning. A further object of the invention is to provide a method and apparatus which allow the stripping to be improved at little expense. These and other advantages of the process and apparatus will be apparent in the following description.

In many processes where non-combustible solids such as decolorizing clays, filter aids, catalysts and the like, are contacted with an oil or other carbonaceous liquid or vapor the solid becomes contaminated with carbonaceous material which impairs its effectiveness. It is, therefore, the practice to periodically remove the carbonaceous contaminants by a so-called regeneration treatment.

In the regeneration of such contaminated solids the so-called fluidized solid technique is advantageously employed. In this method the solid in power form (i. e., pieces of about 1 mm. or less diameter) is maintained in the pseudo liquid state by controlled aeration with a gas or vapor during the treatment (see U. S. 2,357,901). This technique which is widely used for regenerating such solids, allows better temperature control and allows the whole operation to be carried out continuously with a minimum of equipment. In the process of my invention the fluidized solid technique is used.

The apparatuses for the regeneration of such solids using the fluidized powder technique fall into two distinct types. In the early stages of the development so-called top-draw-off vessels were used. In these the powdered solid is withdrawn overhead as a dilute suspension in the aeration gas. In later designs so-called bottom-draw-off vessels are used. In these the powdered solid is withdrawn downwardly as a pseudo liquid from any point in the fluidized bed. The downflow type of operation has certain advantages. (See Oil and Gas Journal, 43, 64, March 3, 1945.) In the process of my invention a downflow type of regenerator is used.

While other regeneration methods are applicable in some cases, the most common method for regenerating the solid is to remove the major part of the more easily removable contaminants by a so-called stripping treatment and then to remove the remaining contaminants by burning under controlled conditions. The method of my invention is of this type.

In the operation it is important to effect as efficient stripping as possible. By efficiently stripping the spent solid before burning, not only is an appreciable amount of valuable product recovered, but the time and cost of the burning step are reduced and the danger of overheating during the burning is greatly reduced. The efficiency of the stripping is a function of the time, of the amount of stripping gas used, e. g., steam, and also of the temperature. Within reasonable limits the efficiency of the stripping varies with the temperature according to the equation.

$$\text{Stripping efficiency} = \frac{(T)^{4.3}}{1000}$$

where $T$ is the absolute stripping temperature. From this it will be apparent that it is desirable to carry out the stripping step at a relatively high temperature.

On the one hand, it is desirable to carry out the stripping step at a relatively high temperature; on the other hand, the following burning step is highly exothermic and it is necessary to effect some cooling in order to prevent damaging the solid material by overheating. It would, therefore, be desirable if possible to use this extra heat from the burning treatment to increase the temperature in the stripping step. Various indirect heat exchange methods have been considered but they are rather complicated and require costly equipment. A more practical method would be to recycle a portion of the hot material from the burning zone into the stripping zone. This has been previously recognized and certain arrangements allowing this type of operation have been suggested. Examples of such arrangements are found in U. S. Patents Numbers 2,451,619 and 2,526,881 and in copending applications, Serial Numbers 124,674 (U. S. Patent No. 2,604,384 of July 22, 1952) and 146,669, filed October 31, 1949, and February 28, 1950, respectively.

In these previous arrangements, the hot powder must be handled in either one of two ways which are (1) the hot powder is fed from the burning zone (regeneration zone) to the stripping zone by gravity flow and the mixture issuing from the stripping zone must then be raised or pumped back to the burning zone, or (2) the hot powder is pumped to a higher level from which it may then flow by gravity through the stripping zone back to the burning zone. In either case, a separate pumping of the material is required.

According to this invention, the desired circulation is effected without any separate pumping (as by a separate gas lift) and certain additional advantages are obtained. Before describing the arrangement in detail, however, certain additional features of such systems should be mentioned. As previously pointed out, the downflow type of units have certain advantages and the invention relates to such systems. In the downflow type units the powder in the burning zone is maintained in the form of a dense fluidized bed (pseudo liquid bed). The combustion gases bubbling up through this bed tend to throw large amounts of the powder up above the dense bed level. In order to avoid large losses of the powder with the gases leaving the apparatus, it is the practice to allow a large settling space above the bed level. This space (so-called disengaging space) is usually at least 15 feet in depth. The concentration of powder in the gas in this space is relatively high just above the bed and falls off at higher positions until at the top of the space it is quite small. Even though the concentration of the powder in the gas at the top of the disengaging space is quite low, the loss of this material with the effluent gases would be prohibitive. Consequently, it is the practice to pass the effluent gases through a cyclone type dust separator.

For certain practical reasons the cyclone type separator is built within the disengaging space. The gaseous effluent enters the separator tangentially at the side; the gaseous effluent denuded of suspended solid passes out at the top, and the solid particles collect in the bottom of the separator from where they are returned to the fluidized bed by a dip leg. Since the operation of centrifugal type separators requires an appreciable pressure drop, the pressure in the separator is somewhat below that of the surrounding atmosphere. In order to insure flow of the separated particles from the separator back to the fluidized bed, it is, therefore, necessary that the dip leg be sufficiently long to provide the necessary static head. This means that the cyclone separator must be mounted at a considerable height above the top level of the fluidized bed. Thus, the minimum allowable distance between the entrance to the cyclone separator and the top of the dense bed is in a typical case about 8–10 feet. At this elevation the concentration of solids in the entering gases is quite low and the amount of solid material collected in the cyclone separator is quite small.

The apparatus of this invention is arranged to allow the stripping and the burning to be carried out within partitioned zones of the same vessel. This has the advantage of providing a simple arrangement which is not costly to build, and also of allowing an appreciable amount of heat from the burning to be transferred through the partition to the adjacent stripping section. More important, however, the desired circulation of hot powder from the burning zone to the stripping zone to provide direct heat transfer is accomplished by passing the dip leg of the cyclone separator in the burning zone through the partition separating the burning zone from the stripping zone. The desired circulation is, therefore, effected without any special gas lift or other pumping means. However, as explained above, the amount of solids separated by the cyclone, and hence the amount of circulation possible using a conventional cyclone arrangement would be altogether too small to afford any significant effect. This shortcoming is remedied by mounting the cyclone in the usual manner above a dip leg of suitable length and extending the inlet down to a lower level where the normal loading in the gas is much higher.

Having explained the background and broader principles involved, the apparatus of the invention will be described in more detail with reference to the accompanying drawing wherein Figures I and II are a vertical section and a plan section, respectively, of one suitable apparatus.

Referring to the drawing, the apparatus comprises a cylindrical shell 1 preferably swaged to a larger diameter near the top, and provided with top and bottom closures. The vessel is divided into a stripping zone A and a burning zone B by a depending partition 2 which ends somewhat short of the bottom to allow a passageway between the two zones. Suitable gas distributing means 3 for injecting stripping gas, e. g., steam, are provided at essentially the bottom of the stripping zone just above the lower end of the partition. A suitable gas distributing means 4 for injection of the air for burning is likewise provided near the bottom of the burning zone just above the lower end of the partition. The apparatus is also provided with an inlet conduit for contaminated powder to be heated. This inlet 5 is situated near the swage line and enters the top of the stripping zone. An exit conduit 6 for the withdrawal of treated powder is provided near the top of the burning zone In normal operation of such apparatus, the level of the powder being treated is at approximately the swage line or lower. The space above the normal powder level is designated the disengaging space. Cyclone type dust separators 7 and 8 are mounted in the disengaging spaces of the stripping and burning zones, respectively. In the apparatus illustrated the cyclone separators are illustrated diagrammatically. In practice somewhat more complicated separators, usually staged, are used. In these separators the gas carrying the suspended solids enters the separator at the upper enlarged section by a tangential inlet (see 11 in separator 7). The gases pass downward in a helical path and are then discharged upwardly through a central duct to the discharge lines 9 and 10. The solids thrown to the periphery by the centrifugal force run down the side into the lower conical section from which they are withdrawn by the lines 12 and 13. Since the pressure in the cone is below that prevailing outside of the apparatus, and since the separated powder affords only a small static head for a given height, it is necessary that the distance between the bottom of the cones to the top of the bed of powder be appreciable. As stated, a minimum distance of about 8–10 feet is necessary between the top of the bed of powder and the tangential inlet 11 of the separator. Also, in order to seal the lines 12 and 13 (so-called dip legs) they are extended downwardly an additional distance so that their lower ends are within the bed of powder. In the apparatus of the invention the dip leg 13 of the cyclone separator in the disengaging space of the burning zone is passed through the partition 2 so that it discharges directly into the fluidized bed in the stripping zone. The dip leg 12 of the cyclone separator in the disengaging space of the stripping zone may dip into the fluidized bed in the same zone, but in a preferred embodiment the dip leg is also passed through the baffle so that it discharges into the fluidized bed in the burning zone.

The inlet 11 to the cyclone separator 7 in the stripping zone is constructed in the conventional manner. The inlet to the cyclone 8 in the burning zone, however, is provided with a depending inlet duct 14.

In operation the powder containing combustible contaminants is charged to the apparatus in a uniform stream by line 5. The solid passes downwardly in the stripping zone while being maintained in a fluidized condition and while being stripped of part of the contaminants by a stripping gas, e. g., steam, introduced through the perforated pipe distributor 3. The stripped solid then flows under the end of the partition and up through the burning zone. Air supplied by the distributor 4 supplies the oxygen for combustion and maintains the powder in the fluidized state. The regenerated powder leaves the apparatus as a continuous stream by line 6.

The hot spent combustion gases containing suspended powder pass into the inlet to the duct 14 and through said duct into the cyclone 8. The spent gases substantially free of suspended solids are discharged by line 10; the separated hot powder is then passed by line 13 to the stripping zone. The amount of hot solid thus cycled to and from the burning zone to the stripping zone may be controlled by adjustment of the length of the duct 14, i. e., the position of its inlet and may be regulated during operation by adjustment of the height of the fluidized bed of powder.

While in the preferred embodiment of the invention both the stripping zone and burning zone are provided with centrifugal type separators and the dip legs of both separators pass in opposite directions through the partition, the separator in the stripping zone is not an essential element. In some cases solids carried in suspension in the gases are more conveniently separated and recovered in a separate apparatus in the recovery of the stripped products.

I claim as my invention:

1. An apparatus for the stripping and regeneration of finely divided solids contaminated with combustible material which comprises in combination an elongated vertically disposed vessel, a vertical partition extending from the top of said vessel to a point short of the bottom thereof and dividing the vessel into a striping zone and a contiguous burning zone, an inlet conduit for contaminated solids entering the stripping zone, an outlet for regenerated solids leaving the burning zone, gas distribution means in the stripping and burning zones near the bottom thereof, a centrifugal dust collector in the burning zone in the upper part thereof communicating with a discharge conduit for spent combustion gases, a dip leg depending from said centrifugal dust collector, said dip leg passing through said partition and having its discharge end in the stripping zone, and an inlet duct extending downward a substantial distance from the point of entry of the gas feed into the centrifugal separator.

2. Apparatus according to claim 1 further characterized in that said apparatus is also provided with a centrifugal dust collector in the stripping zone in the upper part thereof and a dip leg depending from said latter centrifugal dust collector and passing through the said partition.

WILLIAM V. MEDLIN.

References Cited in the file of this patent

UNITED STATES PATENTS

| Number | Name | Date |
|---|---|---|
| 2,411,208 | Hall et al. | Nov. 19, 1946 |
| 2,477,751 | Johnson | Aug. 2, 1949 |
| 2,488,031 | Gunness | Nov. 15, 1949 |
| 2,571,380 | Penick | Oct. 16, 1951 |